(12) United States Patent
Hsieh

(10) Patent No.: US 7,385,369 B2
(45) Date of Patent: Jun. 10, 2008

(54) AC FAN MOTOR DRIVING CIRCUIT HAVING CAPABILITY OF MONITORING THE ROTATION RATE AND STATUS OF THE AC FAN MOTOR

(75) Inventor: Hsin-Mao Hsieh, Ping Tung (TW)

(73) Assignee: Adda Corp. (TW)

( * ) Notice: Subject to any disclaimer, the term of this patent is extended or adjusted under 35 U.S.C. 154(b) by 50 days.

(21) Appl. No.: 11/590,514

(22) Filed: Oct. 31, 2006

(65) Prior Publication Data
US 2008/0100239 A1 May 1, 2008

(51) Int. Cl.
*H02P 6/10* (2006.01)
*H02H 7/085* (2006.01)

(52) U.S. Cl. .................. 318/434; 318/254; 318/721
(58) Field of Classification Search ................ 318/138, 318/254, 434, 439, 461, 720–724
See application file for complete search history.

(56) References Cited

U.S. PATENT DOCUMENTS

| | | | | |
|---|---|---|---|---|
| 4,307,325 A | * | 12/1981 | Saar | 388/809 |
| 4,656,553 A | * | 4/1987 | Brown | 361/31 |
| 5,363,024 A | * | 11/1994 | Hiratsuka et al. | 318/400.08 |
| 6,023,139 A | * | 2/2000 | Chin | 318/434 |
| 7,057,363 B2 | * | 6/2006 | Ku | 318/268 |
| 7,141,950 B1 | * | 11/2006 | Verge | 318/400.29 |

* cited by examiner

*Primary Examiner*—Bentsu Ro
(74) *Attorney, Agent, or Firm*—Jackson Walker, LLP

(57) ABSTRACT

A driving circuit has a driving circuit module, a rotation rate detecting module and a rotation status detecting module. The driving circuit module is used to drive an AC fan motor and has at least a driving IC having two controlling outputs and a rotation status detecting output. The rotation rate detecting module has a transistor and an photo coupler. The transistor is connected to one of the two controlling outputs of the driving IC. The photo coupler is connected to the transistor and outputs a rotation rate signal to compute the rotation rate of the AC fan motor. The rotation status detecting module has an photo coupler connected to the rotation status detecting output of the driving IC and outputting a rotation status signal to determine whether the AC fan motor operates normally.

8 Claims, 3 Drawing Sheets

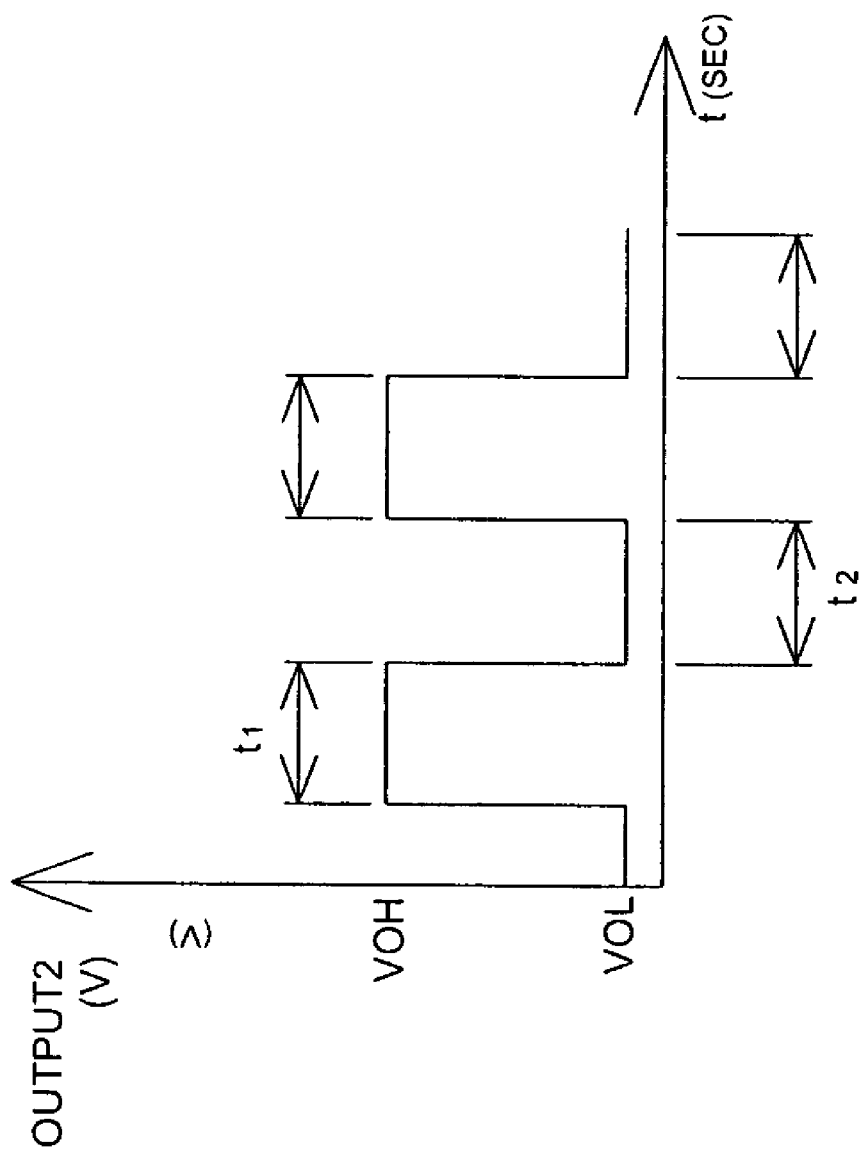

AC FAN MOTOR DRIVING CIRCUIT HAVING CAPABILITY OF MONITORING THE ROTATION RATE AND STATUS OF THE AC FAN MOTOR

BACKGROUND OF THE INVENTION

1. Field of the Invention

The present invention relates to a driving circuit for an AC fan motor, and more particularly to an AC fan motor driving circuit with capability of monitoring the rotation rate and status of the AC fan motor.

2. Description of Related Art

Computers, such as desktop computers or notebook computers, are widely used in people's normal life. Each computer processes data by a central processing unit (CPU) mounted in the computer. The temperature of the CPU often overheats since the CPU processes a great amount of data. For this reason, a fan is mounted on the CPU to cool the CPU. However, if the fan is locked due to failure, the computer may suddenly shut down because of the significant increase in the temperature of the CPU. Furthermore, high temperature also results in damage to the CPU. Users can not easily acquire the rotation rate and the rotation status of the fan because the fan is mounted in the computer.

To overcome the shortcomings, the present invention provides a driving circuit for an AC fan motor to mitigate or obviate the aforementioned problems.

SUMMARY OF THE INVENTION

The main objective of the invention is to provide an AC fan motor driving circuit with capability of monitoring the rotation rate and status of the AC fan motor.

A driving circuit in accordance with the present invention comprises a driving circuit module, a rotation rate detecting module and a rotation status detecting module. The driving circuit module is used to drive an AC fan motor and at least comprises a driving IC. The driving IC has two controlling outputs and a rotation status detecting output. The two controlling outputs alternately output a trigger signal. The rotation status detecting output is unconnected when the AC fan motor is locked and connects to ground when the AC fan motor operates normally. The rotation rate detecting module comprises a transistor and an photo coupler. The base terminal of the transistor in the rotation rate detecting module is connected to one of the two controlling outputs of the driving IC in the driving circuit module. The photo coupler has an input and at least one output. The input of the photo coupler is connected to the transistor in the rotation rate detecting module. The output of the photo coupler in the rotation rate detecting module outputs a rotation rate signal to compute the rotation rate of the AC fan motor. The rotation status detecting module comprises an photo coupler. The photo coupler in the rotation status detecting module has an input and at least one output. The input of the photo coupler in the rotation status detecting module is connected to the rotation status detecting output of the driving IC. The output of the photo coupler in the rotation status detecting module outputs a rotation status signal to determine whether the AC fan motor operates normally.

Other objectives, advantages and novel features of the invention will become more apparent from the following detailed description when taken in conjunction with the accompanying drawings.

BRIEF DESCRIPTION OF THE DRAWINGS

FIG. 3 is a graph illustrating a rotation rate detecting signal.

DETAILED DESCRIPTION OF PREFERRED EMBODIMENT

Figure 1:
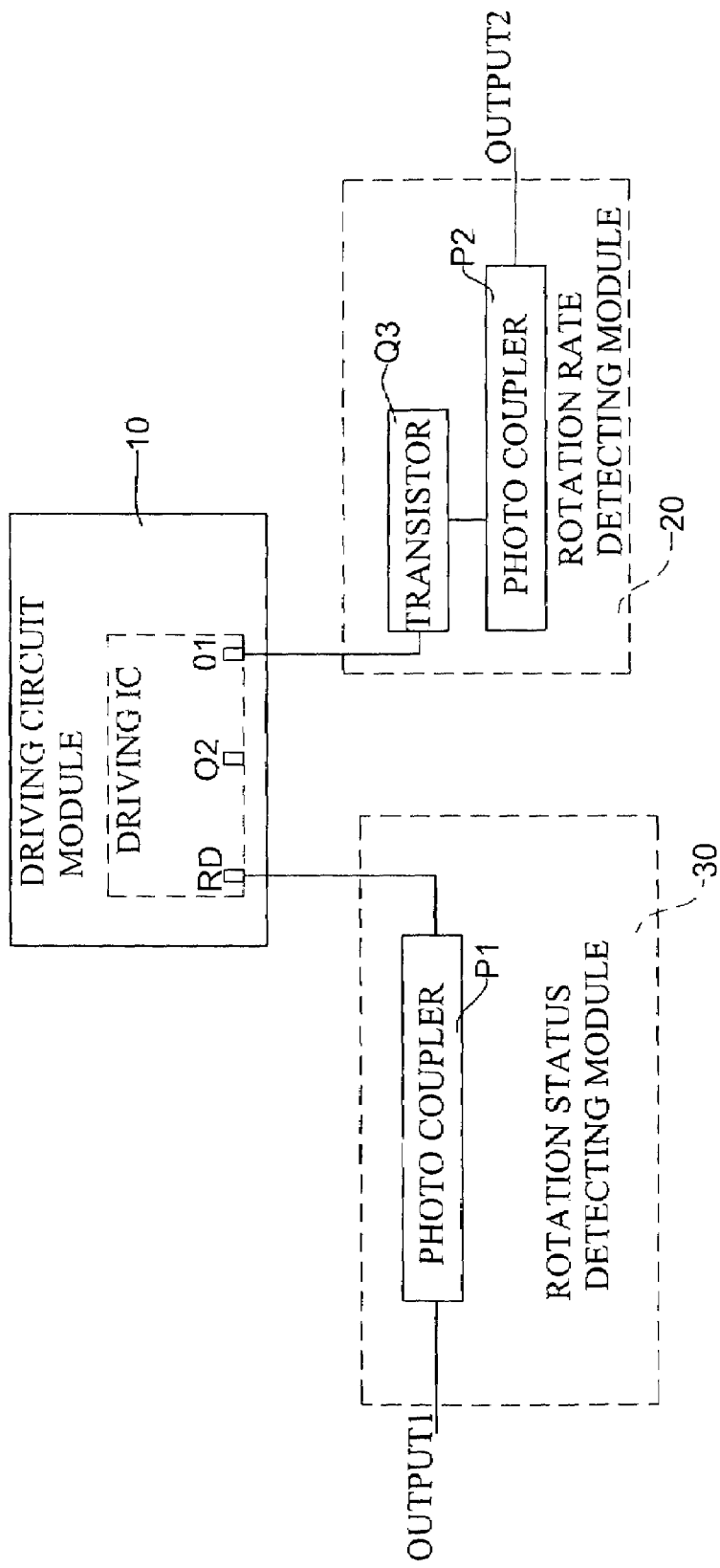
FIG. 1 is a functional block diagram of a driving circuit for an AC fan motor in accordance with the present invention.

With reference to FIG. 1, a driving circuit for an AC fan motor in accordance with the present invention comprises a driving circuit module (10), a rotation rate detecting module (20) and a rotation status detecting module (30).

Figure 2:
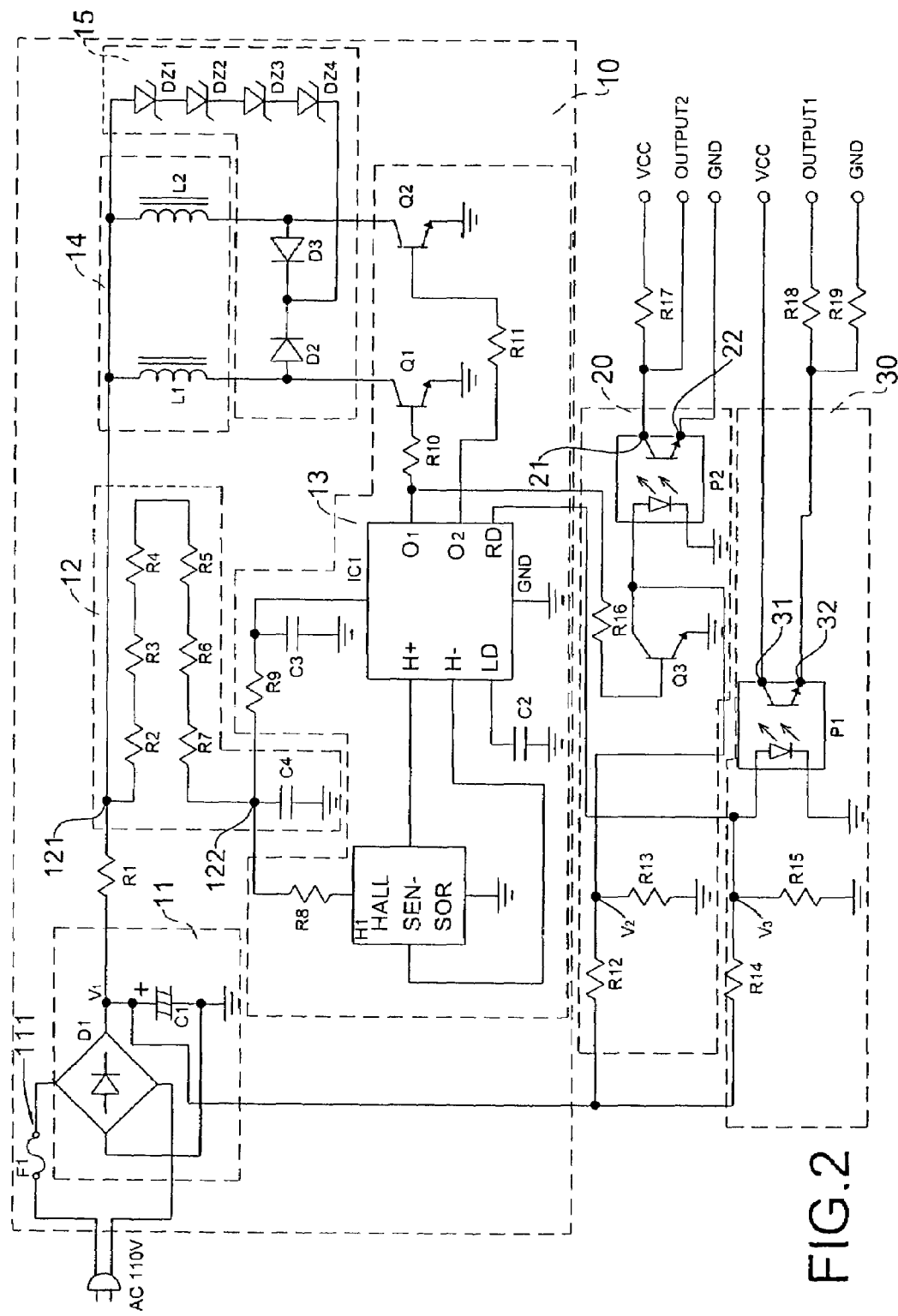
FIG. 2 is a circuit diagram of a first embodiment of the driving circuit in FIG. 1.

With further reference to FIG. 2, the driving circuit module (10) is used to drive an AC fan and comprises an AC to DC converter (11), an optional current protection unit, a voltage descending unit (12), a driving unit (13), a winding unit (14) and a harmonic suppression unit (15).

The AC to DC converter (11) comprises a rectifier (D1) and a filter to convert an AC power into a high voltage DC power. The rectifier (D1) has an AC power input and a DC power output (V1) and may be a full wave rectifier. The AC power input is connected to an external AC power source. The DC power output (V1) outputs the high voltage DC power. The filter is connected to the DC power output (V1) of the rectifier (D1) and can be a capacitor (C1).

The current protection unit is connected between the rectifier (D1) and the external AC power source and may be implemented with a fuse (111).

The voltage descending unit (12) is connected to the DC power output (V1) and the filter of the AC to DC converter (11). The voltage descending unit (12) comprises a resistor string and a capacitor (C4) to transform the high voltage DC power into a low voltage DC power. The resistor string has a first end (121) and a second end (122) and comprises multiple resistors (R2)~(R7). The first end (121) of the resistor string is connected to the DC power output (V1) of the rectifier (D1). The multiple resistors (R2)~(R7) are connected in series. The capacitor (C4) is connected to the second end (122) of the resistor string to filter noise.

The driving unit (13) is connected to the second end (122) of the resistor string in the voltage descending unit (12) and comprises a first transistor (Q1), a second transistor (Q2), a driving IC (IC1) and a Hall sensor (H1).

The first transistor (Q1) and the second transistor (Q2) respectively have a base terminal, a collector terminal and an emitter terminal.

The driving IC (IC1) has a DC input, two Hall signal inputs (H+, H−), two controlling outputs (O1, O2) and a rotation status detecting output (RD). The DC input is connected to the second end (122) of the resistor string in the voltage descending unit (12) to obtain operating power. The controlling outputs (O1, O2) are respectively connected to the base terminals of the first and the second transistor (Q1, Q2) to alternately output a trigger signal to the first and the second transistors (Q1, Q2). The rotation status detecting output (RD) is unconnected when the AC fan motor is locked. The rotation status detecting output (RD) connects to ground when the AC fan motor operates normally.

The Hall sensor (H1) has a DC input and two outputs. The DC input of the Hall sensor (H1) is connected to the second end (122) of the resistor string in the voltage descending unit (12) to obtain operating power. The two outputs of the Hall sensor (H1) are respectively connected to the Hall signal inputs (H+, H−) of the driving IC (IC1).

The winding unit (14) comprises a first winding (L1) and a second winding (L2). The two windings (L1, L2) are connected between the DC power output (V1) of the rectifier (D1) and the collector terminals of the first and the second transistors (Q1, Q2).

The harmonic suppression unit (15) is connected to the DC power output (V1) of the rectifier (D1) and is also connected to the winding unit (14) in parallel. The harmonic suppression unit (15) comprises two diodes (D2, D3) and a zener diode string. Each diode (D2, D3) has a positive terminal and a negative terminal. The positive terminals of the two diodes (D2, D3) are respectively connected to the collector terminals of the first and the second transistors (Q1, Q2). The negative terminals of the two diodes (D2, D3) are connected together. The zener diode string has a first end and a second end and comprises multiple zener diodes (DZ1)~(DZ4). The first end of the zener diode string is connected to the DC power output (V1) of the rectifier (D1). The second end of the zener diode string is connected to the negative terminals of the two diodes (D2, D3). The multiple zener diodes (DZ1)~(DZ4) are connected in series.

The rotation rate detecting module (20) outputs a rotation rate signal that is used to compute the rotation rate of the AC fan motor. The rotation rate detecting module (20) comprises an optional voltage divider, a transistor (Q3) and a photo coupler (P2).

The voltage divider of the rotation rate detecting module (20) comprises a first resistor (R12) and a second resistor (R13) connected in series at a node (V2). The first resistor (R12) is connected to the DC power output (V1). The node (V2) is defined between the first resistor (R12) and the second resistor (R13).

The transistor (Q3) has a base terminal, a collector terminal and an emitter terminal. The base terminal of the transistor (Q3) is connected to one of the two controlling outputs (O1, O2) of the driving IC (IC1) through a resistor (R16). The collector terminal of the transistor (Q3) is connected to the node (V2) in the voltage divider.

The photo coupler (P2) has an input, a open collector output (21) and a switch controlling output (22) and is equivalent to an photo signal emitting diode (D4) and a phototransistor (Q4). The input of the photo coupler (P2) is connected to collector terminal of the transistor (Q3) and the node (V2) of the voltage divider in the rotation rate detecting module (20). The open collector output (21) is connected to another external power source (VCC) through a resistor (R17). The switch controlling output (22) is grounded. The photo signal emitting diode (D4) emits a light beam and has a positive terminal and a negative terminal. The positive terminal of the photo signal emitting diode (D4) is the input of the photo coupler (P2). The phototransistor (Q4) is triggered by the light beam emitted by the photo signal emitting diode (D4).

With further reference to FIG. 3, when the controlling output (O1) of the driving IC (IC1) takes t1 seconds to output a trigger signal to the base terminal of the transistor (Q3), the transistor (Q3) is turned on and grounds the node (V2) of the voltage divider in the rotation rate detecting module (20). As a result, the photo coupler (P2) is off and then the voltage level on the open collector output (21) is in high level. In addition, the transistor (Q3) is turned off when the controlling output (O1) of the driving IC (IC1) takes t2 seconds to stop outputting the trigger signal. Thus the photo coupler (P2) is on and then the voltage level on the open collector output (21) is in low level. Therefore, the rotation rate of the AC fan motor is equal to 30*f (RPM), wherein f=1/(t1+t2).

The rotation status detecting module (30) outputs a rotation status signal that is used to determine whether the AC fan motor operates normally. The rotation status detecting module (30) comprises an optional voltage divider and a photo coupler (P1).

The voltage divider of the rotation status detecting module (30) comprises a first resistor (R14) and a second resistor (R15) connected in series at a node (V3). The first resistor (R14) is connected to the DC power output (V1). The node (V3) is defined between the first resistor (R14) and the second resistor (R15).

The photo coupler (P1) has an input, a open collector output (31) and a switch controlling output (32) and is equivalent to an photo signal emitting diode (D5) and a phototransistor (Q5). The input of the photo coupler (P1) is connected to the rotation status detecting output (RD) of the driving IC (IC1) and the node (V3) of the voltage divider in the rotation status detecting module (30). The open collector output (31) is connected to the external power source (VCC). The switch controlling output (32) is grounded through a resistor (19). The photo signal emitting diode (D5) emits a light beam and has a positive terminal and a negative terminal. The positive terminal of the photo signal emitting diode (D5) is the input of the photo coupler (P1). The phototransistor (Q5) is triggered by the light beam emitted by the photo signal emitting diode (D5).

When the AC fan motor normally operates, the rotation status detecting output (RD) grounds the node (V3) of the voltage divider in the rotation status detecting module (30). Furthermore, the photo coupler (P1) is off and then the voltage level on the switch controlling output (32) of the photo coupler (P1) is in low level. Comparatively, the rotation status detecting output (RD) is unconnected when the AC fan motor is locked. Furthermore, the photo coupler (P1) is on and then the voltage level on the switch controlling output (32) of the photo coupler (P1) is in high level. Therefore, the high-level voltage on the switch controlling output (32) can be provided for controlling a system power source or for triggering an external buzzer to alarm user that the AC fan motor is locked.

Such a driving circuit provides capability of monitoring the rotation rate and status of the AC fan motor. A follow-up circuit can be easily designed to receive the rotation rate signal and the rotation status signal. Therefore, users can have information of the rotation rate and the rotation status of the AC fan motor according to the rotation rate signal and the rotation status signal.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An AC fan motor driving circuit having capability of monitoring rotation rate and status of the AC fan motor driving circuit comprising:
    a driving circuit module used to drive an AC fan and at least comprising a driving IC that has
        two controlling outputs alternately outputting a trigger signal; and a rotation status detecting output, wherein the rotation status detecting output is unconnected when the AC fan motor is in a lock condition and connects to ground when the AC fan motor operates normally;

a rotation rate detecting module comprising
 a transistor connected to one of the two controlling outputs of the driving IC; and
 a photo coupler having
  an input connected to the transistor; and
  at least one output outputting a rotation rate signal for computing the rotation rate of the AC fan motor; and a rotation status detecting module comprising
 a photo coupler having
  an input connected to the rotation status detecting output of the driving IC; and
  at least one output outputting a rotation status signal to determine whether the AC fan motor operates normally.

2. The driving circuit as claimed in claim 1, wherein the driving circuit module further comprising:
 an AC to DC converter comprising
  a rectifier having
   an AC power input adapted to connect to an external AC power source; and
   a DC power output; and
  a filter connected to the DC power output;
 a voltage descending unit connected to the DC power output and the filter of the AC to DC converter and comprising
  a resistor string comprising multiple resistors connected in series and having
   a first end connected to the DC power output of the rectifier; and
   a second end; and
  a capacitor connected to the second end of the resistor string;
 a driving unit connected to the second end of the resistor string in the voltage descending unit and comprising
  a first and a second transistors respectively having a collector terminal, an emitter terminal and a base terminal, and the base terminals of the first and the second transistors respectively connected to the controlling outputs of the driving IC;
  the driving IC further having
   a DC input connected to the second end of the resistor string in the voltage descending unit; and
   two Hall signal inputs; and
  a Hall sensor having
   a DC input connected to the second end of the resistor string in the voltage descending unit; and
   two outputs connected to the Hall signal inputs of the driving IC;
 a winding unit comprising a first and a second windings connected between the DC power output of the rectifier and the collector terminals of the first and the second transistors in the driving unit; and
 a harmonic suppression unit connected to the DC power output of the rectifier and also connected to the winding unit in parallel and comprising
  two diodes respectively having a positive terminal and a negative terminal, wherein the positive terminals of the two diodes are respectively connected to the collector terminals of the first and the second transistors of the driving unit, and the negative terminals of the two diodes are connected together; and
  a zener diode string comprising multiple zener diodes connected in series and having
   a first end connected to the DC power output of the rectifier; and
   a second end connected to the negative terminals of the two diodes.

3. The driving circuit as claimed in claim 2, wherein the rectifier in the AC to DC converter is a full wave rectifier.

4. The driving circuit as claimed in claim 2, wherein the filter in the AC to DC converter is a capacitor.

5. The driving circuit as claimed in claim 2, wherein the driving circuit module further comprises a current protection unit connected between the rectifier and the external AC power source.

6. The driving circuit as claimed in claim 5, wherein the current protection unit is a fuse.

7. The driving circuit as claimed in claim 2, the rotation rate detecting module further comprising a voltage divider that has a first resistor and a second resistor connected in series at a node, wherein
 the first resistor is connected to the DC power output of the rectifier in the AC to DC converter; and
 the node is connected to the transistor and the photo coupler of the rotation rate detecting module.

8. The driving circuit as claimed in claim 2, the rotation status detecting module further comprising a voltage divider that has a first resistor and a second resistor connected in series at a node, wherein
 the first resistor is connected to the DC power output of the rectifier in the AC to DC converter; and
 the node is connected to the rotation status detecting output of the driving IC and the photo coupler in the rotation status detecting module.

* * * * *